(12) United States Patent
Fujiwara et al.

(10) Patent No.: US 10,850,354 B2
(45) Date of Patent: Dec. 1, 2020

(54) LASER WELDING METHOD (71) Applicant: Panasonic Intellectual Property Management Co., Ltd., Osaka (JP)

(72) Inventors: Junji Fujiwara, Osaka (JP); Atsuhiro Kawamoto, Hyogo (JP); Tatsuyuki Nakagawa, Osaka (JP); Noriyuki Matsuoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 659 days.

(21) Appl. No.: 15/569,850

(22) PCT Filed: May 24, 2016

(86) PCT No.: PCT/JP2016/002503
§ 371 (c)(1),
(2) Date: Oct. 27, 2017

(87) PCT Pub. No.: WO2016/189855
PCT Pub. Date: Dec. 1, 2016

(65) Prior Publication Data
US 2018/0117707 A1 May 3, 2018

(30) Foreign Application Priority Data
May 28, 2015 (JP) .................. 2015-108774

(51) Int. Cl.
*B23K 26/57* (2014.01)
*B23K 26/22* (2006.01)
(Continued)

(52) U.S. Cl.
CPC ............ *B23K 26/57* (2015.10); *B23K 26/082* (2015.10); *B23K 26/0884* (2013.01);
(Continued)

(58) Field of Classification Search
CPC ...... B23K 26/22; B23K 26/57; B23K 26/082; B23K 26/21; B23K 26/244; B23K 26/0884; Y10T 403/477
(Continued)

(56) References Cited

U.S. PATENT DOCUMENTS

| 4,320,281 | A | * | 3/1982 | Cruickshank | ........ | B23K 1/0056 |
| | | | | | | 219/121.14 |
| 2008/0217307 | A1 | * | 9/2008 | Dauvel | ................ | B23K 26/244 |
| | | | | | | 219/121.64 |
| 2012/0097650 | A1 | * | 4/2012 | Takahashi | .............. | B23K 33/00 |
| | | | | | | 219/121.64 |

FOREIGN PATENT DOCUMENTS

| EP | 1 516 691 | 3/2005 |
| JP | 7-155974 | 6/1995 |

(Continued)

OTHER PUBLICATIONS

Japanese Publication JP-2015047625-A Machine Translation; Hakoishi; Mar. 2015 (Year: 2015).*

(Continued)

*Primary Examiner* — Lorene E Meade
*Assistant Examiner* — Michael S. Poetzinger
(74) *Attorney, Agent, or Firm* — Wenderoth, Lind & Ponack, L.L.P.

(57) ABSTRACT

A laser welding control method according to the present disclosure includes: a first step of causing a first steel plate having a protrusion and a second steel plate to overlap so that a tip of the protrusion provided on the first steel plate makes contact with the second steel plate; and a second step of irradiating the protrusion with laser light in an irradiation pattern having a size larger than a size of the protrusion in plan view after the first step. At least one of a surface of the (Continued)

first steel plate that faces the second steel plate and a surface of the second steel plate that faces the first steel plate is plated.

4 Claims, 8 Drawing Sheets

(51) Int. Cl.
   *B23K 26/082* (2014.01)
   *B23K 26/322* (2014.01)
   *B23K 26/08* (2014.01)
   *B23K 26/244* (2014.01)
   *B23K 26/21* (2014.01)
   *B23K 101/18* (2006.01)
   *B23K 103/04* (2006.01)
   *B23K 101/00* (2006.01)
   *B23K 101/34* (2006.01)

(52) U.S. Cl.
   CPC .............. *B23K 26/21* (2015.10); *B23K 26/22* (2013.01); *B23K 26/244* (2015.10); *B23K 26/322* (2013.01); *B23K 2101/006* (2018.08); *B23K 2101/18* (2018.08); *B23K 2101/34* (2018.08); *B23K 2103/04* (2018.08)

(58) Field of Classification Search
   USPC .............. 219/93, 94, 121.64, 121.78, 121.79, 219/121.8; 403/270
   See application file for complete search history.

(56) References Cited

FOREIGN PATENT DOCUMENTS

| | | |
|---|---|---|
| JP | 10-071480 | 3/1998 |
| JP | 10-216974 | 8/1998 |
| JP | 2008-049392 | 3/2008 |
| JP | 2009-072799 | 4/2009 |
| JP | 2011-156572 | 8/2011 |
| JP | 2011-173146 | 9/2011 |
| JP | 2011-194403 | 10/2011 |
| JP | 2015-047625 | 3/2015 |
| JP | 2015-074012 | 4/2015 |

OTHER PUBLICATIONS

Japanese Publication JP-2015074012-A Machine Translation, Kinoshita Keisuke, Apr. 2015 (Year: 2015).*
Communication pursuant to Article 94(3) EPC dated Jan. 18, 2019 for the related European Patent Application No. 16799568.7.
International Search Report of PCT application No. PCT/JP2016/002503 dated Aug. 9, 2016.

* cited by examiner

LASER WELDING METHOD

This application is a U.S. national stage application of the PCT International Application No. PCT/JP2016/002503 filed on May 24, 2016, which claims the benefit of foreign priority of Japanese patent application No. 2015-108774 filed on May 28, 2015, the contents all of which are incorporated herein by reference.

TECHNICAL FIELD

The present disclosure relates to a laser welding control method that is effective for reducing a number of blowholes and a number of pits in laser welding of objects to be welded that are surface-treated members such as galvanized steel plates.

BACKGROUND ART

A galvanized steel plate is excellent in resistance to rust and corrosion. For this reason, in recent years, demands for a galvanized steel plate are increasing year by year, for example, for use as automobile parts and building steel-frame parts.

However, there is a problem in use of a galvanized steel plate. Zinc with which a surface of a galvanized steel plate is plated has a melting point lower than that of iron. Therefore, when the galvanized steel plate is welded, zinc vaporizes, and zinc vapor tends to diffuse to an outside through molten pool and molten metal. However, according to laser welding, which has a faster welding speed than arc welding and the like, the molten metal solidifies faster, and therefore the zinc vapor cannot completely diffuse to the outside.

As a result, the zinc vapor often remains as a blowhole or a pit (hereinafter referred to as a gas pocket) in a weld bead or on a weld bead surface. Such a gas pocket may undesirably lead to a severe welding defect. Furthermore, such a gas pocket sometimes leads to opening of a hole and occurrence of spatter because of an explosion phenomenon.

In order to prevent a welding defect such as a blowhole, a method for forming a minute gap from which plated-metal gas escapes between two overlapping metal-plated plates is disclosed (see, for example, PTL 1 and PTL 2).

Figure 8:
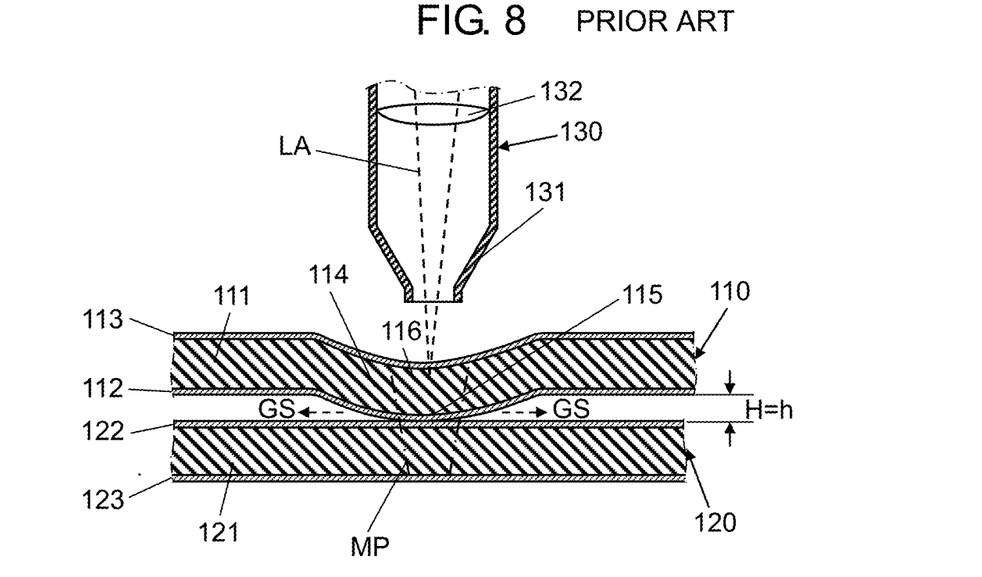
FIG. 8 illustrates an outline of a cross section of members to be welded in conventional (PTL 1) laser welding.

PTL 1 is described below with reference to FIG. 8. The two overlapping plated steel plates (plated steel plate 110 and plated steel plate 120) are disposed so that protrusion 114 of plated steel plate 110 makes linear contact with a surface of plated steel plate 120. Gap H (0.1 mm or more) is formed between plated steel plate 110 and plated steel plate 120 by protrusion 114. Gap H is equal to a height h of protrusion 114. Plated steel plate 110 is irradiated with laser beam LA. Plated steel plate 110 is seam-welded by being irradiated with laser beam LA along groove 116 from groove 116 side opposite to vertex 115 of protrusion 114. Although illustration of an entire configuration of laser device 130 is omitted, laser beam LA output from a laser generating device (not illustrated) converges onto plated steel plate 110 as a minute spot of a high energy density through lens 132 held by lens holder 131. First, an irradiated local portion of plated steel plate 110 melts, and then an irradiated local portion of second plated steel plate 120 melts. A region indicated by the alternate long and two short dashes line in FIG. 8 is molten pool MP. Although plated layer 112, plated layer 113, plated layer 122, and plated 123 also melt and metal vapor GS is generated, metal vapor GS generated at a part where plated steel plate 110 and plated steel plate 120 are joined is released to atmosphere through gap H. Therefore, a gas pocket does not remain in molten pool MP. Since a surface of molten pool MP of plated steel plate 110 is not disturbed, the surface becomes smooth, and undercut does not occur.

PTL 2 is described below with reference to FIG. 9. Plated steel plate 210 has protrusion 230 and protrusion 231. After plated steel plate 210 and plated steel plate 220 are overlapped with each other, welding is performed by irradiating region R between protrusion 230 and protrusion 231 with laser beam 250 output from a laser generating device (not illustrated). Gap H is formed between plated steel plate 210 and plated steel plate 220 by protrusion 230 and protrusion 231. Gap H is equal to a height h of the protrusions. Region R between protrusion 230 and protrusion 231 of plated steel plate 210 is irradiated with laser beam 250. Laser beam 250 is emitted as a minute spot that is out of focus through lens 252 held by beam irradiation nozzle 251.

An irradiation position of laser beam 250 is generally a midpoint between protrusion 230 and protrusion 231, but may be displaced from the midpoint as long as the irradiation position is within region R between protrusion 230 and protrusion 231 excluding protrusion 230 and protrusion 231. An irradiated part of plated steel plate 210 and an irradiated part of plated steel plate 220 melt in this order by irradiation of laser beam 250, and thus molten pool 260 is formed. Plated layers 212a, 212b, 222a, and 222b also melt, and thereby metal vapor is generated. The metal vapor generated from plated layers 212a and 222a is released to atmosphere through space S formed between plated steel plate 210 and plated steel plate 220. Therefore, a gas pocket does not remain in molten pool 260. Since no blowhole is generated in molten pool 260 upon completion of welding, molten pool 260 has a smooth surface and has constant welding strength.

CITATION LIST

Patent Literature

PTL 1: Unexamined Japanese Patent Publication No. H07-155974

PTL 2: Unexamined Japanese Patent Publication No. H10-216974

SUMMARY OF THE INVENTION

A laser welding control method according to the present disclosure includes: a first step of causing a first steel plate having a protrusion and a second steel plate to overlap so that a tip of the protrusion provided on the first steel plate makes contact with the second steel plate; and a second step of irradiating the protrusion with laser light in an irradiation pattern having a size larger than a size of the protrusion in plan view after the first step. At least one of a surface of the first steel plate that faces the second steel plate and a surface of the second steel plate that faces the first steel plate is plated.

DESCRIPTION OF EMBODIMENTS

Prior to describing exemplary embodiments of the present disclosure, problems of conventional laser welding will be briefly described.

According to the laser welding control method described in PTL 1, protrusion 114 of plated steel plate 110 makes linear contact with the surface of plated steel plate 120, and gap H (for example, H=0.1 mm or more) is formed between plated steel plate 110 and plated steel plate 120. Note that a length from a surface of plated steel plate 110 that faces plated steel plate 120 to vertex 115 of protrusion 114 (height h of protrusion 114) is equal to gap H. Groove 116 of plated steel plate 110 is irradiated with laser beam LA, and plated steel plate 110 and plated steel plate 120 are seam-welded. However, in a case where an irradiated position of laser beam LA is displaced to left or right, a part having a gap between plated steel plate 110 and plated steel plate 120 is laser-welded.

Furthermore, in a case where plated steel plate 110 has a protrusion (not illustrated) other than protrusion 114, in some cases, the protrusion other than protrusion 114 and plated steel plate 120 make contact with each other and protrusion 114 and plated steel plate 120 do not make contact with each other. That is, a gap may be formed between protrusion 114 and plated steel plate 120. In a case where the gap between protrusion 114 and plated steel plate 120 is large, this may lead to a welding defect such as opening of a hole.

In the conventional laser welding control method described in PTL 2, welding is performed by causing plated steel plate 210 and plated steel plate 220 to overlap and then irradiating region R between protrusion 230 and protrusion 231 of plated steel plate 210 with laser beam 250. Laser beam 250 is output from the laser generating device (not illustrated). Protrusion 230 and protrusion 231 of plated steel plate 210 make contact with a surface of plated steel plate 220, and gap H (H=0.1 mm in this case) is formed between plated steel plate 210 and plated steel plate 220.

However, both of protrusion 230 and protrusion 231 do not necessarily make contact with plated steel plate 220 depending on accuracy of workpiece setting and jig fixing. For example, in some cases, one of the protrusions (protrusion 230 in this case) does not make contact with plated steel plate 220, and gap H that is equal to larger than height h of protrusion 230 (0.1 mm in the present exemplary embodiment) is formed between plated steel plate 210 and plated steel plate 220. In such cases, gap H between plated steel plate 210 and plated steel plate 220 may undesirably become larger than height h of protrusion 230 also in region R, thereby leading to a welding defect such as opening of a hole.

Figure 9:
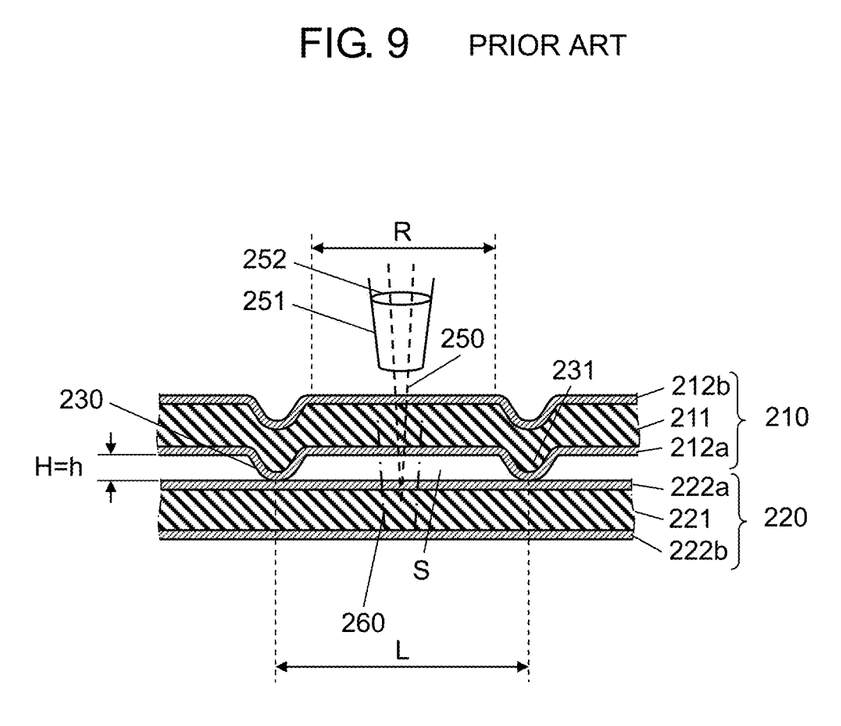
FIG. 9 illustrates an outline of a cross section of members to be welded in conventional (PTL 2) laser welding.

The state where gap H>height h is not illustrated in FIG. 9.

Figure 1:
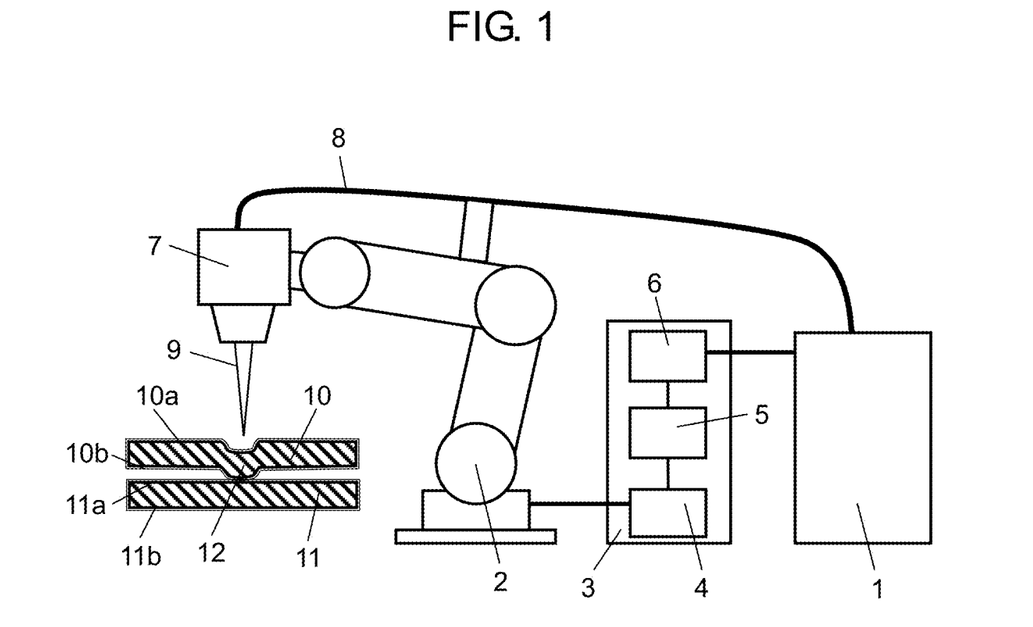
FIG. 1 illustrates a schematic configuration of a laser welding device according to a first exemplary embodiment of the present disclosure.
Figure 2A:
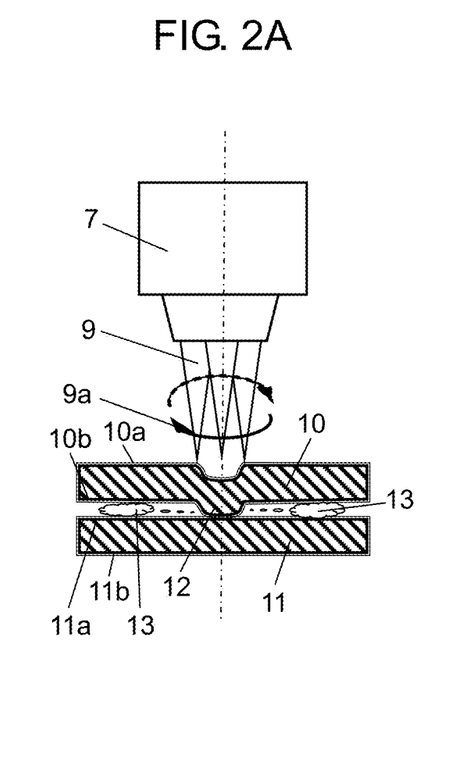
FIG. 2A illustrates spiral laser irradiation according to the first exemplary embodiment of the present disclosure.
Figure 2B:
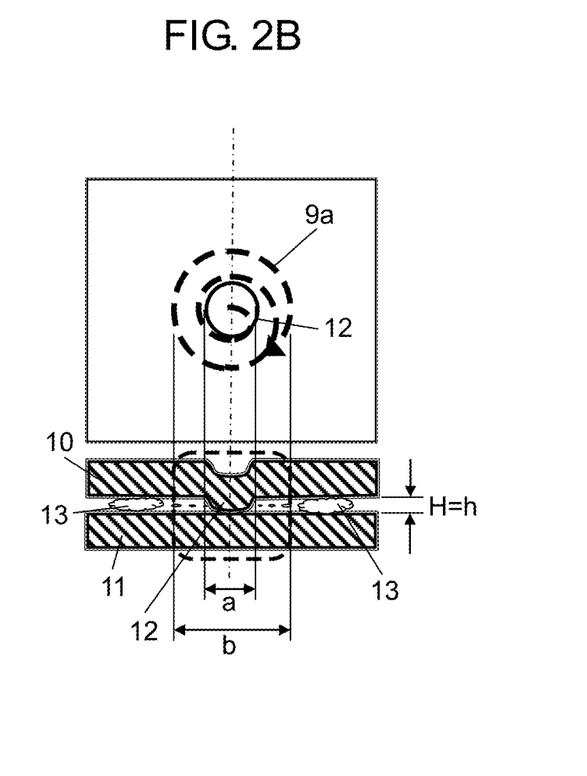
FIG. 2B illustrates a relationship between a diameter of a protrusion and a spiral diameter in a spiral irradiation pattern according to the first exemplary embodiment of the present disclosure.
Figure 2C:
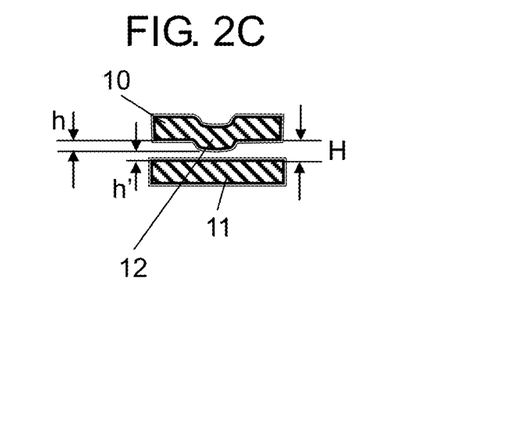
FIG. 2C partially illustrates another protrusion according to the first exemplary embodiment of the present disclosure.
Figure 3:
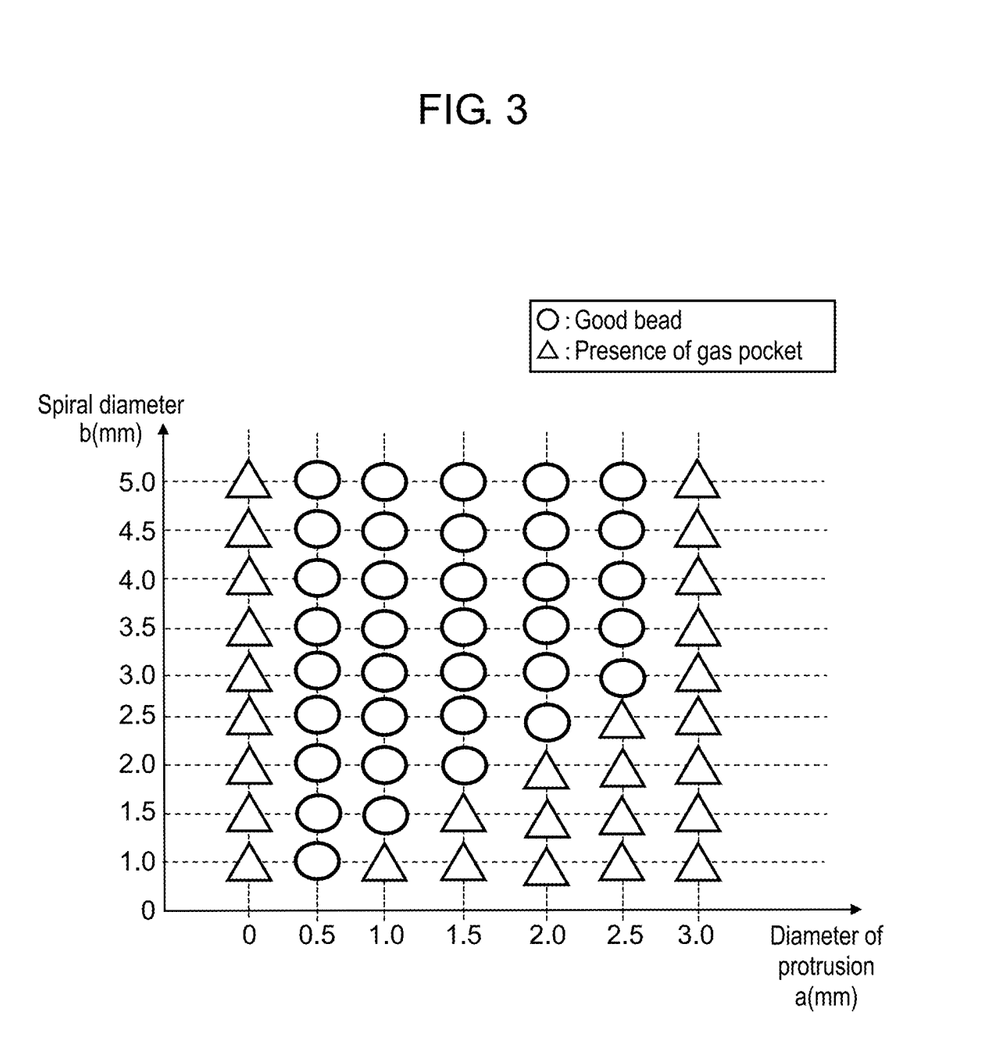
FIG. 3 illustrates an appropriate range of the diameter of the protrusion and the spiral diameter according to the first exemplary embodiment of the present disclosure.
Figure 4A:
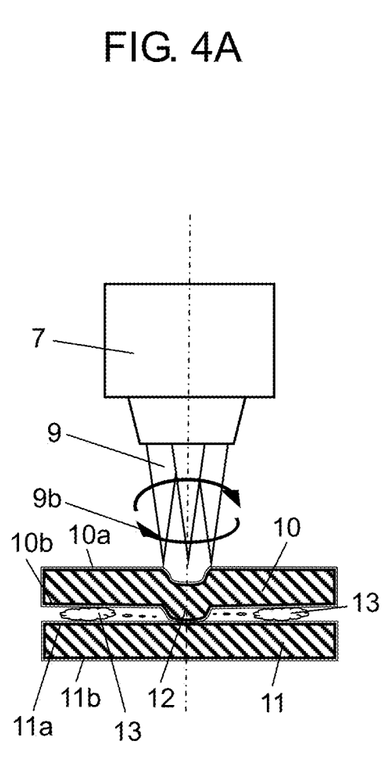
FIG. 4A illustrates helical laser irradiation according to a second exemplary embodiment of the present disclosure.
Figure 4B:
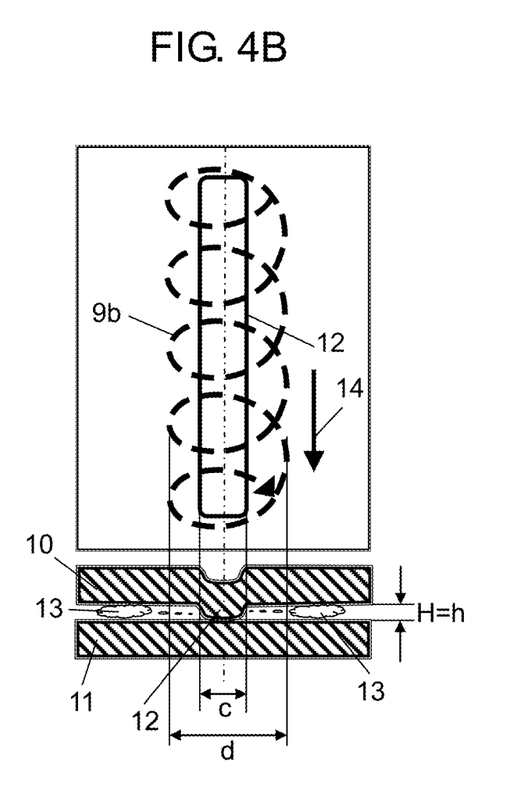
FIG. 4B illustrates a relationship between a width of a protrusion and a helix width in a helical irradiation pattern according to the second exemplary embodiment of the present disclosure.
Figure 5:
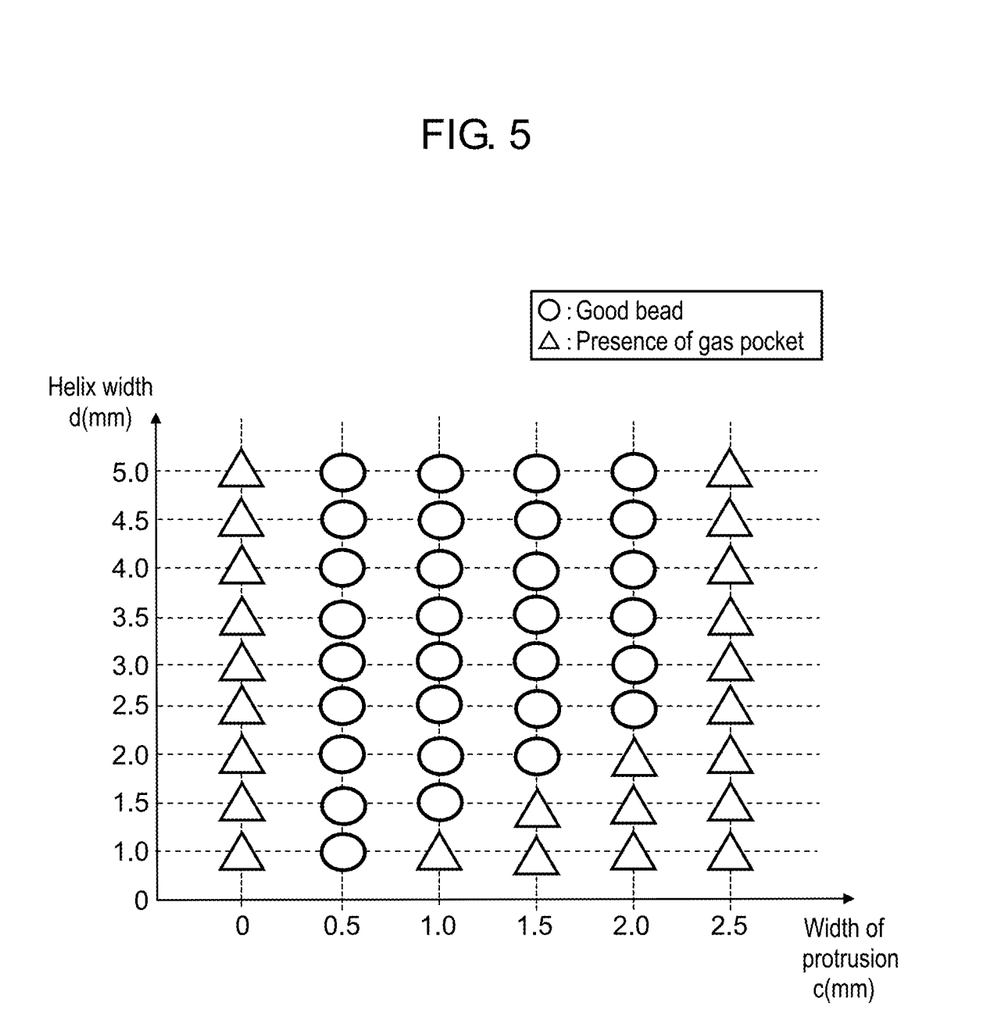
FIG. 5 illustrates an appropriate range of the width of the protrusion and the helix width according to the second exemplary embodiment of the present disclosure.
Figure 6:
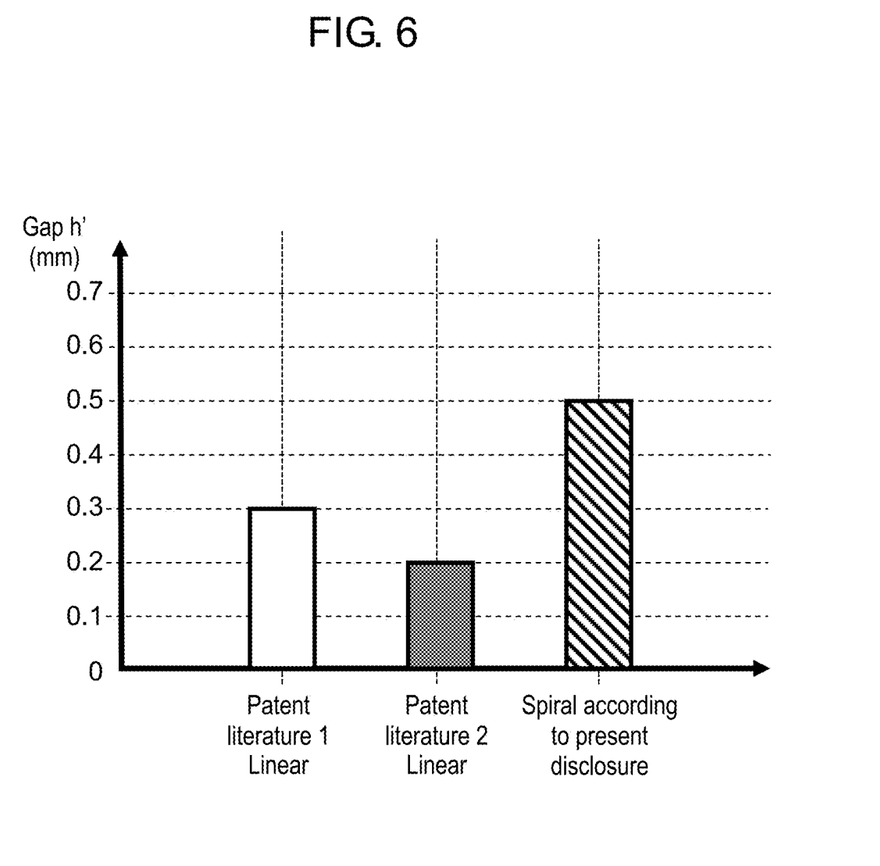
FIG. 6 illustrates tolerance of a gap according to the second exemplary embodiment of the present disclosure.
Figure 7:
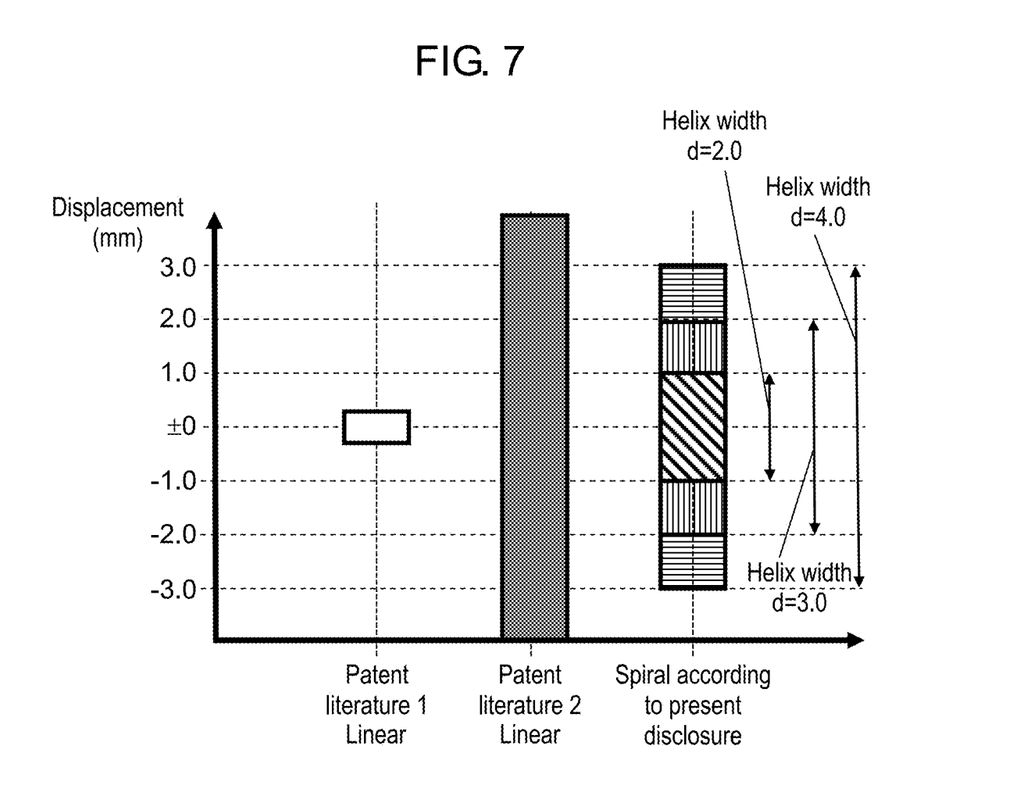
FIG. 7 illustrates tolerance of displacement according to the second exemplary embodiment of the present disclosure.

Exemplary embodiments of the present disclosure will be described below with reference to FIGS. 1 to 7. FIG. 1 illustrates a schematic configuration of a laser welding device. FIG. 2A illustrates spiral laser irradiation. FIG. 2B illustrates a relationship between diameter a of protrusion 12 and spiral diameter b in a spiral irradiation pattern. FIG. 2C partially illustrates another protrusion. FIG. 3 illustrates an example of tolerance of diameter a of protrusion 12. FIG. 4A illustrates helical laser irradiation. FIG. 4B illustrates a relationship between width c of protrusion 12 and helix width d in a helical irradiation pattern. FIG. 5 illustrates an example of tolerance of width c of protrusion 12. FIG. 6 illustrates an example of tolerance of a gap, and FIG. 7 illustrates an example of tolerance of displacement.

First Exemplary Embodiment

The present exemplary embodiment will be described below with reference to FIGS. 1 to 3.

A laser welding device illustrated in FIG. 1 is a device for laser welding. The laser welding device illustrated in FIG. 1 is a device that joins pieces of metal by irradiating the metal with laser light that is condensed as a heat source and thereby locally melting and solidifying the metal. The following describes an example in which galvanized steel plates are laser-welded by using the laser welding device.

The laser welding device illustrated in FIG. 1 includes laser oscillator 1, robot 2, laser irradiation head 7 that irradiates upper plate 10 and lower plate 11 that are to be welded with laser light 9, robot controller 3 that controls members such as laser oscillator 1, robot 2, and laser irradiation head 7, and transmission fiber 8 that transmits laser light 9 from laser oscillator 1 to laser irradiation head 7.

Laser light 9 having a beam diameter that depends on laser oscillator 1 and transmission fiber 8 is transmitted to laser irradiation head 7. Laser irradiation head 7 is attached to robot 2. For example, a laser irradiation head using an optical device such as a galvanometer mirror may be used as laser irradiation head 7.

Robot controller 3 includes welding condition setting controller 4, operation controller 5, and laser output controller 6. Welding condition setting controller 4, for example, sets a laser welding condition and gives a command to other constituent elements. Operation controller 5 controls an operation of robot 2 or laser irradiation head 7 based on the welding condition set by welding condition setting controller 4, an operation program that is given in advance, and the like. Laser output controller 6 controls laser oscillator 1 in order to control laser output based on the welding condition set by welding condition setting controller 4.

This laser welding device oscillates laser light 9 from laser oscillator 1 and causes laser light 9 oscillated from laser oscillator 1 to be converged by a condensing lens (not illustrated) that is provided in laser irradiation head 7. Then, overlapped upper plate 10 and lower plate 11 that are to be welded are irradiated with laser light 9 that has been converged by the condensing lens from a direction in which upper plate 10 and lower plate 11 are overlapped with each other (from the upper side in FIG. 2A), and thus upper plate 10 and lower plate 11 are welded.

Next, a method of laser welding of galvanized steel plates will be described with reference to FIGS. 2A, 2B, and 2C. Laser welding described below is performed by using the laser welding device illustrated in FIG. 1.

First, welding of galvanized steel plates that are welded by laser irradiation in a spiral irradiation pattern is described with reference to FIGS. 2A and 2B. In the present exemplary embodiment, each of upper plate 10 and lower plate 11 is a galvanized steel plate. Upper plate 10 and lower plate 11 need not necessarily be a galvanized steel plate.

First, upper plate 10 and lower plate 11 are overlapped with each other. Then, irradiation of laser light 9 starts from a central position of protrusion 12 that is provided in advance on upper plate 10. Irradiation of laser light 9 is performed from the center of protrusion 12 in accordance with spiral irradiation pattern 9a. The laser irradiation ends when laser light 9 reaches an outer circumferential part of spiral irradiation pattern 9a.

Output laser light 9 has an energy density such that upper plate 10 and lower plate 11 that are galvanized steel plates can be penetrated. The energy density and laser output vary depending on thicknesses of upper plate 10 and lower plate 11, and as the thicknesses become larger, a higher energy density is required and output of laser light 9 is set higher.

Upper plate 10 has galvanized layer 10a and galvanized layer 10b, and lower plate 11 has galvanized layer 11a and galvanized layer 11b. Since zinc vapor 13 is generated in gap H between upper plate 10 and lower plate 11 when upper plate 10 and lower plate 11 are welded by irradiation of laser light 9, upper plate 10 and lower plate 11 can be welded without influence of zinc vapor 13.

As described above, in the laser welding method according to the present exemplary embodiment, welding is performed in a spiral manner in irradiation pattern 9a that is larger than protrusion 12 from the central position of circular protrusion 12 that is provided in advance on upper plate 10 that is a galvanized steel plate, as illustrated in FIG. 2B. This can create a path through which zinc vapor 13 is discharged from overlapping surfaces of upper plate 10 and lower plate 11 that are galvanized steel plates.

In the present disclosure, the circular shape includes a disc shape and an oval shape.

Needless to say, good welding requires an appropriate condition.

A positional relationship between upper plate 10 and lower plate 11 will be described below with reference to FIGS. 2B and 2C.

For example, in a case where upper plate 10 has a plurality of protrusions 12, all protrusions 12 do not necessarily make contact with lower plate 11 depending on design accuracy. FIG. 2B illustrates a positional relationship in a case where protrusion 12 makes contact with lower plate 11, and FIG. 2C illustrates a positional relationship in a case where protrusion 12 does not make contact with lower plate 11. FIG. 2C illustrates only a part corresponding to a region surrounded by the broken line in FIG. 2B, and illustration of other parts is omitted.

As illustrated in FIG. 2B, in a case where protrusion 12 and lower plate 11 are in contact with each other, a height (hereinafter referred to as "height h") of protrusion 12 is equal to a length (hereinafter referred to as "gap H") between a surface of upper plate 10 that faces lower plate 11 and a surface of lower plate 11 that faces upper plate 10.

Meanwhile, as illustrated in FIG. 2C, in a case where protrusion 12 and lower plate 11 are not in contact with each other, height h of protrusion 12 is not equal to gap H. Assuming that a length between a tip of protrusion 12 and the surface of lower plate 11 that faces upper plate 10 is gap h', H=h+h'.

Next, an appropriate range of spiral diameter b of spiral irradiation pattern 9a with respect to diameter a of protrusion 12 in plan view will be described with reference to FIG. 3. FIG. 3 illustrates an example, and the present disclosure is not limited to this.

Conditions used for construction evaluation illustrated in FIG. 3 are as follows. Galvanized steel plates each having a plating coating density of 45 $g/m^2$ and a thickness of 0.8 mm were used as upper plate 10 and lower plate 11. Gap h' was set to 0 mm, and height h of protrusion 12 was set to 0.1 mm. Welding was performed on conditions that output was 2.5 kW and speed was 6 m/min. The horizontal axis represents diameter a of protrusion 12 of upper plate 10, and the vertical axis represents spiral diameter b of irradiation pattern 9a.

The result of the construction evaluation illustrated in FIG. 3 shows an appropriate range in which a good welding result is obtained. In FIG. 3, whether welding was performed well or not is indicated by a circle or a triangle. The circle indicates a case where bead appearance is good as a result of visual check, and the triangle indicates a case where a gas pocket remains as a result of visual check. As is clear from FIG. 3, in a case where diameter a of protrusion 12 is equal to or smaller than 2.5 mm, a discharge path of zinc vapor 13 is secured and good bead appearance can be obtained as long as spiral diameter b is set larger than diameter a of protrusion 12. Specifically, spiral diameter b only needs to be larger than diameter a of protrusion 12 by 0.5 mm or more.

For example, spiral diameter b needs to be 1.0 mm or larger in a case where diameter a of protrusion 12 is 0.5 mm, and spiral diameter b needs to be 3.0 mm or larger in a case where diameter a of protrusion 12 is 2.5 mm. However, in a case where diameter a of protrusion 12 is 3.0 mm or larger, a contact area between upper plate 10 and lower plate 11 increases. Because of the increase in contact area, the effect obtained by protrusion 12 is lost. As a result, it becomes hard to discharge zinc vapor 13, and a blowhole and a pit remain in a weld bead or on a weld bead surface.

Second Exemplary Embodiment

Next, a case where protrusion 12 has a linear shape in plan view will be described with reference to FIGS. 4A and 4B. In the present exemplary embodiment, irradiation pattern 9b moves relative to objects to be welded along a helical path that circles around a center of rotation moving in welding direction 14. That is, irradiation pattern 9a has a spiral shape in the first exemplary embodiment, whereas irradiation pattern 9b has a helical shape in the present exemplary embodiment. Protrusion 12 has a circular shape in the first exemplary embodiment, whereas protrusion 12 has a linear shape in the present exemplary embodiment. In the present exemplary embodiment, welding of galvanized steel plates welded by laser irradiation of a linear protrusion in a helical pattern is described. It should be noted that elements similar to those in the first exemplary embodiment are given identical reference signs, and description of such elements is sometimes omitted.

In a laser welding device according to the present exemplary embodiment, both of upper plate 10 and lower plate 11 are galvanized steel plates. Upper plate 10 and lower plate 11 need not necessarily be a galvanized steel plate.

First, upper plate 10 and lower plate 11 are overlapped with each other. Then, irradiation of laser light 9 starts from a central position of protrusion 12 that is provided in advance on upper plate 10. Irradiation of laser light 9 is performed from the central position of protrusion 12 in accordance with helical irradiation pattern 9b. Welding is performed by laser irradiation in helix width d larger than width c of protrusion 12 based on the central position of protrusion 12.

Output laser light 9 has an energy density such that upper plate 10 and lower plate 11 that are galvanized steel plates can be penetrated. The energy density and laser output vary depending on thicknesses of upper plate 10 and lower plate 11, and as the thicknesses become larger, a higher energy density is required and output of laser light 9 is set higher.

Upper plate 10 has galvanized layer 10a and galvanized layer 10b, and lower plate 11 has galvanized layer 11a and galvanized layer 11b. Since zinc vapor 13 is generated from gap H by welding of upper plate 10 and lower plate 11 by irradiation of laser light 9, upper plate 10 and lower plate 11 can be welded without influence of the zinc vapor.

As described above, in the laser welding method according to the present exemplary embodiment, welding is performed in a helical manner in an irradiation pattern having a helix width that is larger than the width of protrusion 12 from the central position of linear protrusion 12 provided in advance on upper plate 10 that is a galvanized steel plate, as illustrated in FIG. 4B. This can create a path through which zinc vapor 13 is discharged from overlapping surfaces of upper plate 10 and lower plate 11 that are galvanized steel plates.

Needless to say, good welding requires an appropriate condition.

Next, an appropriate range of helix width d with respect to width c of protrusion 12 that is a line width of protrusion 12 in plan view will be described with reference to FIG. 5. FIG. 5 illustrates an example, and the present disclosure is not limited to this.

Conditions used for construction evaluation illustrated in FIG. 5 are as follows.

Galvanized steel plates each having a plating coating density of 45 g/m$^2$ and a thickness of 0.8 mm were used as upper plate 10 and lower plate 11. Gap h' was set to 0 mm, and height h of protrusion 12 was set to 0.1 mm. Welding was performed on conditions that output was 2.5 kW and speed was 2 m/min. The horizontal axis represents width c of protrusion 12 of upper plate 10, and the vertical axis represents helix width d of irradiation pattern 9b.

The result of the construction evaluation illustrated in FIG. 5 shows an appropriate range in which a good welding result was obtained. In FIG. 5, whether welding was performed well or not is indicated by a circle or a triangle.

The circle indicates a case where bead appearance is good as a result of visual check, and the triangle indicates a case where a gas pocket remains as a result of visual check. As is clear from FIG. 5, in a case where width c of protrusion 12 is equal to or smaller than 2.0 mm, a discharge path of zinc vapor 13 is secured and good bead appearance can be obtained as long as helix width d is set larger than width c.

Specifically, helix width d only needs to be larger than width c of protrusion 12 by 0.5 mm or more.

For example, helix width d needs to be 1.0 mm or larger in a case where width c is 0.5 mm, and helix width d needs to be 2.5 mm or larger in a case where width c is 2.0 mm. However, in a case where width c of protrusion 12 is 2.5 mm or larger, a contact area between protrusion 12 of upper plate 10 that is a galvanized steel plate and lower plate 11 increases. Because of the increase in contact area, the effect obtained by protrusion 12 is lost, and it becomes hard to discharge zinc vapor 13, and a blowhole and a pit remain in a weld bead or on a weld bead surface.

[Tolerance of Gap]

Tolerance of a gap in welding of galvanized steel plates that are welded by helical laser irradiation will be described with reference to FIG. 6.

FIG. 6 illustrates a result of construction evaluation concerning tolerance of a gap. In FIG. 6, the horizontal axis represents a welding method (comparison between PTL 1, PTL 2, and the present disclosure), and the vertical axis represents gap h'. In this construction evaluation, galvanized steel plates each having a plating coating density of 45 g/m$^2$ and a thickness of 0.8 mm were used as the upper plate and the lower plate. Height h of the protrusion was set to 0.1 mm, and the width of the protrusion was set to 0.5 mm. FIG. 6 illustrates an appropriate range in which a good welding result is obtained.

In PTL 1 illustrated in FIG. 8, which discloses a linear welding method that involves linear laser irradiation from an upper side of linear protrusion 114, gap h' between a tip of protrusion 114 and plated steel plate 120 is 0.3 mm at most. Note that a configuration having gap h' is not illustrated in FIG. 8.

This is because a bead obtained by linear welding has a narrow width, and a necessary amount of molten metal cannot be secured in gap h' that exceeds the limit value.

In PTL 2 illustrated in FIG. 9, which discloses a welding method that involves linear laser irradiation between protrusion 230 and protrusion 231, a gap of 0.1 mm, which is height h of protrusion 230 (or protrusion 231), is present from the beginning in a region between protrusion 230 and protrusion 231. Gap H between plated steel plate 210 and plated steel plate 220 in the region between protrusion 230 and protrusion 231 is 0.3 mm at most. That is, gap h' between a tip of protrusion 230 (or a tip of protrusion 231) and plated steel plate 220 is 0.2 mm at most. This is because a bead obtained by linear welding that involves linear laser irradiation has a narrow width, and a necessary amount of molten metal cannot be secured in gap h' that exceeds the limit value, as in PTL 1. Note that a configuration having gap h' is not illustrated in FIG. 9.

Meanwhile, in the helical welding according to the present disclosure described with reference to FIGS. 4A to 5, gap h' between protrusion 12 and a corresponding plated steel plate (lower plate 11) can be widened to 0.5 mm without a problem by performing helical welding above protrusion 12. This is because a larger amount of molten metal can be secured since a bead width can be made larger in the welding method according to the second exemplary embodiment that involves helical laser irradiation than that in linear welding involving linear irradiation. Therefore, a necessary amount of molten metal can be secured in gap h' between protrusion 12 and the corresponding plated steel plate (lower plate 11).

Allowance of a gap in a case where upper plate 10 having a thickness of 0.8 mm and lower plate 11 having a thickness of 0.8 mm are overlapped is approximately ⅓ of the thickness in linear welding involving linear laser irradiation as in PTL 1 and PTL 2, but is approximately ⅔ of the thickness in the helical welding involving helical laser irradiation according to the present disclosure. That is, the tolerance can be increased by approximately 1.7 times.

[Tolerance of Displacement]

Next, an example of tolerance of displacement in welding of galvanized steel plates that are welded by helical laser irradiation will be described below with reference to FIG. 7.

FIG. 7 illustrates a result of construction evaluation concerning tolerance of displacement. In FIG. 7, the horizontal axis represents a welding method (comparison between PTL 1, PTL 2, and the present disclosure), and the vertical axis represents displacement. In this construction evaluation, galvanized steel plates each having a plating coating density of 45 g/m$^2$ and a thickness of 0.8 mm were used as the upper plate and lower plate. Height h of the protrusion was set to 0.1 mm, and the width of the protrusion was set to 0.5 mm FIG. 7 illustrates an appropriate range in which a good welding result is obtained.

In PTL 1 illustrated in FIG. 8, which discloses a welding method involving laser irradiation from an upper side of protrusion 114, a position displaced from the center of protrusion 114 out of a range of 0.5 mm that is a width of protrusion 114 is a position where protrusion 114 is not provided (a region where gap H is formed between plated steel plate 110 and plated steel plate 120), and therefore opening of a hole is more likely to occur.

In PTL 2 illustrated in FIG. 9, which discloses a welding method involving laser irradiation between protrusion 230 and protrusion 231 between which constant gap H is formed, welding can be performed without a problem as long as a welding position is within a region where gap H whose size in a plate thickness direction is constant is formed between protrusion 230 and protrusion 231.

Meanwhile, in the helical welding according to the present disclosure described with reference to FIGS. 4A to 5, displacement tolerance varies depending on helix width d. In the welding method according to the present disclosure, good bead appearance can be obtained as long as helix width d is set larger than width c of protrusion 12 by 0.5 mm or more. That is, the displacement tolerance is made wider as helix width d is made larger. As illustrated in FIG. 7, for example, displacement can be ±1 mm from the protrusion center in a case where helix width d is 2 mm, displacement can be ±2 mm from the protrusion center in a case where helix width d is 3 mm, and displacement can be ±3 mm from the protrusion center in a case where helix width d is 4 mm. In any state, it is easy to discharge zinc vapor 13, and a blowhole and a pit can be prevented from remaining in a weld bead or on a weld bead surface.

As is clear from the above description, in the laser welding method according to the present disclosure, upper plate 10 having protrusion 12 and lower plate 11 are overlapped so that the tip of protrusion 12 provided on upper plate 10 makes contact with lower plate 11. Furthermore, objects to be welded (upper plate 10 and lower plate 11), at least one of which is a plated steel plate, are overlapped and welded by helical laser irradiation in irradiation pattern 9b having a size larger than the size of protrusion 12 in plan view. This makes it possible to secure tolerance of displacement in welding performed in a state where upper plate 10 and lower plate 11 are overlapped so that protrusion 12 provided on at least one steel plate makes contact with lower plate 11 that faces protrusion 12. Furthermore, it is possible to improve tolerance of gap h' between protrusion 12 and a plated steel plate (lower plate 11) that faces protrusion 12. That is, both of construction tolerance of gap h' between protrusion 12 and the corresponding plated steel plate (lower plate 11) and construction tolerance of displacement that varies depending on a helix width can be improved.

In a case of a welding method involving irradiation of protrusion 12 with laser light that is defocused so that a bead width becomes larger than an outer shape of protrusion 12, an energy density is high at a bead center and becomes lower toward a bead edge. Accordingly, penetration depth is deeper in vicinity of the bead center and is shallower in vicinity of the bead edge. That is, penetration cannot be made uniform throughout the entire bead width. In the welding involving helical laser irradiation according to the present disclosure, the helical laser irradiation involving keyhole welding can make penetration almost uniform throughout an entire bead width, thereby improving welding performance.

According to the present disclosure, in laser welding of surface-treated steel plates such as galvanized steel plates, protrusion 12 is irradiated with laser in a spiral or helical irradiation pattern having a predetermined size larger than the size of the protrusion. This makes it possible to perform welding without influence of zinc vapor and without concern about displacement and a gap. It is therefore possible to suppress occurrence of a gas pocket in a weld bead or on a weld bead surface. This can improve welding performance.

In the present disclosure, similar effects can be obtained not only by helical irradiation pattern 9b, but also by spiral irradiation pattern 9a described above.

As described above, the laser welding method according to the present disclosure includes a first step of causing upper plate 10 having protrusion 12 and lower plate 11 to overlap so that the tip of protrusion 12 provided on upper plate 10 makes contact with lower plate 11. Furthermore, the laser welding method according to the present disclosure includes a second step of irradiating protrusion 12 with laser light in irradiation pattern 9a (or irradiation pattern 9b) having a size larger than the size of protrusion 12 in plan view after the first step. At least one of a surface of upper plate 10 that faces lower plate 11 and a surface of lower plate 11 that faces upper plate 10 is plated.

Therefore, the laser welding method according to the present disclosure makes it possible to smoothly discharge zinc vapor generated from zinc plating, thereby achieving good welding without influence of the zinc vapor. It is possible to suppress occurrence of a gas pocket in a weld bead or on a weld bead surface. This can improve welding performance.

Although an example in which protrusion 12 is provided on upper plate 10 has been described in the present exemplary embodiment, protrusion 12 may be provided on lower plate 11.

In the present exemplary embodiment, an example in which galvanized steel plates are used has been described. However, any surface-treated steel plates are applicable as long as the steel plates are plated with a metal having a melting point lower than that of the steel plates.

INDUSTRIAL APPLICABILITY

As described above, according to the present disclosure, in welding of surface-treated steel plates such as galvanized steel plates, protrusion 12 provided on upper plate 10 or lower plate 11 is irradiated with laser in a spiral or helical irradiation pattern having a size larger than the size of protrusion 12. This makes it possible to smoothly discharge vapor (e.g., zinc vapor generated from zinc plating), thereby achieving good welding without influence of vapor. Since it is possible to suppress occurrence of a gas pocket in a weld bead or on a weld bead surface, welding performance can be improved. Therefore, the present disclosure is industrially useful as a laser welding control method and a laser welding device that weld surface-treated members.

REFERENCE MARKS IN THE DRAWINGS

1: laser oscillator
2: robot
3: robot controller
4: welding condition setting controller
5: operation controller
6: laser output controller
7: laser irradiation head
8: transmission fiber
9: laser light
9a, 9b: irradiation pattern
10: upper plate
10a, 10b: galvanized layer
11a, 11b: galvanized layer
11: lower plate
12, 114, 230, 231: protrusion
13: zinc vapor
14: welding direction
116: groove
GS: metal vapor
H: gap
R: region
h: height
h': gap

The invention claimed is:

1. A laser welding method comprising:
a first step of causing a first steel plate having a protrusion and a second steel plate to overlap so that a tip of the protrusion provided on the first steel plate makes contact with the second steel plate; and
a second step of irradiating the protrusion with the laser light in an irradiation pattern having a size larger than a size of the protrusion in plan view after the first step, wherein at least one of a surface of the first steel plate that faces the second steel plate and a surface of the second steel plate that faces the first steel plate is plated,
the protrusion has a circular shape in the plan view,
the protrusion has a diameter in a range from 0.5 mm to 2.5 mm inclusive in the plan view, and
the protrusion is irradiated with the laser light in a spiral irradiation pattern having a size larger than the size of the protrusion by 0.5 mm or more.

2. A laser welding method comprising:
a first step of causing a first steel plate having a protrusion and a second steel plate to overlap so that a tip of the protrusion provided on the first steel plate makes contact with the second steel plate; and
a second step of irradiating the protrusion with laser light in a helical irradiation pattern having a size larger than a size of the protrusion in plan view after the first step,
wherein at least one of a surface of the first steel plate that faces the second steel plate and a surface of the second steel plate that faces the first steel plate is plated,
the protrusion has a linear shape in the plan view,
the protrusion has a width in a range from 0.5 mm to 2.0 mm inclusive in the plan view, and
a helix width of the helical irradiation pattern of the laser light is larger than the width of the protrusion by 0.5 mm or more.

3. The laser welding method according to claim 2, wherein
a gap between the protrusion and the second steel plate is equal to or smaller than 5/9 of a sum of a height of the protrusion and a thickness of the first steel plate in the second step.

4. The laser welding method according to claim 2, wherein
the helix width is larger than a length of welding displacement from the protrusion by 1 mm or more in the second step.

* * * * *